(12) United States Patent
Liu et al.

(10) Patent No.: US 12,027,739 B2
(45) Date of Patent: Jul. 2, 2024

(54) SEALING STRUCTURE FOR STACK TOWER AND STACK TOWER

(71) Applicants: China Energy Investment Corporation Limited, Beijing (CN); Shenhua New Energy Co., Ltd., Beijing (CN); National Institute of Clean-and-Low-Carbon Energy, Beijing (CN)

(72) Inventors: Zhien Liu, Beijing (CN); Dajun Li, Beijing (CN); Ying Zhang, Beijing (CN); Weihua Zhou, Beijing (CN); Xia Yang, Beijing (CN); Yuqiong Zhang, Beijing (CN); Jason Wang, Mountain View, CA (US); Changlei Liu, Beijing (CN); Brandon Ohara, Mountain View, CA (US)

(73) Assignees: China Energy Investment Corporation Limited, Beijing (CN); Shenhua New Energy Co., Ltd., Beijing (CN); National Institute of Clean And-Low-Carbon Energy, Beijing (CN)

( * ) Notice: Subject to any disclaimer, the term of this patent is extended or adjusted under 35 U.S.C. 154(b) by 138 days.

(21) Appl. No.: 17/245,398

(22) Filed: Apr. 30, 2021

(65) Prior Publication Data

US 2022/0059863 A1    Feb. 24, 2022

(30) Foreign Application Priority Data

Aug. 20, 2020   (CN) .......................... 202010843975.6

(51) Int. Cl.
    *H01M 8/2485*    (2016.01)

(52) U.S. Cl.
    CPC .................. *H01M 8/2485* (2013.01)

(58) Field of Classification Search
    CPC ............. H01M 8/2485; H01M 8/0215; H01M 8/0278; H01M 8/0284; H01M 8/2418;
    (Continued)

(56) References Cited

U.S. PATENT DOCUMENTS

| 5,770,327 A | * | 6/1998 | Barnett | ............... H01M 8/2484 429/465 |
| 7,832,737 B2 | * | 11/2010 | Chou | .................... C04B 37/025 277/653 |

FOREIGN PATENT DOCUMENTS

| EP | 3016192 | * | 3/2019 | ............. H01M 8/24 |
| JP | 2005-294153 | * | 10/2005 | ............. H01M 8/24 |

\* cited by examiner

*Primary Examiner* — Helen Oi K Conley
(74) *Attorney, Agent, or Firm* — Calfee, Halter & Griswold LLP

(57) ABSTRACT

The present invention relates to the field of fuel cell stacks and stack tower or module, in particular to a sealing structure for stack tower and a stack tower. The sealing structure comprises a first component, a second component and a mica spacer, the first component and the second component are opposite to each other, the mica spacer is disposed between the first component and the second component, sealing part is arranged between the mica spacer and at least one of the first component and the second component, and the sealing part comprises a glass ceramic layer and an outer circumferential ceramic cement ring surrounding the glass cement layer; the sealing structure for stack tower has excellent sealing performance and service durability for a fuel cell system.

20 Claims, 2 Drawing Sheets

(58) Field of Classification Search
CPC .............. H01M 8/0276; H01M 8/0286; H01M 2008/1293; Y02E 60/50
See application file for complete search history.

SEALING STRUCTURE FOR STACK TOWER AND STACK TOWER

CROSS REFERENCE TO RELATED APPLICATIONS

The application claims priority to Chinese Application No. 202010843975.6, filed on Aug. 20, 2020, entitled "Sealing Structure for Stack Tower and Stack Tower", which is herein specifically and entirely incorporated by reference.

FIELD

The present invention relates to the field of fuel cell stack structures, in particular to a sealing structure for stack tower and a stack tower having the sealing structure.

BACKGROUND

In fuel cell stacks and the stack towers, good sealing may be required between components. The stability and air-tightness of the sealing may have direct influence on the performance and service life of the fuel cell stacks.

For example, solid oxide fuel cells (SOFCs) are all-solid-state power generation devices that directly convert the chemical energy in fuel gas and oxidizing gas into electric energy, and have advantages including high power generation efficiency, high fuel adaptability, low degradation rate, and little environmental pollution, etc., are reputed as one of the most promising green power generation technologies in the future, and received extensive attention increasingly. SOFCs usually work at 600° C.~1000° C., and have high requirements for materials stability, for example, the stability of sealing material between adjacent components, such as, cells and interconnects, two stacks, or stack and gas manifold plate. To meet such requirements, the sealing material must have excellent chemical stability, thermal stability, mechanical integrity, air-tightness and good insulation performance. In previous arts, the commonly used sealing material is glass, or glass-ceramic, which provides good gas-tightness at fuel cell operation conditions to prevent gas leakage. However, the glass sealing material has fluidity at high temperatures. When the SOFC operates for a long time under high stress, such as self-weight of the stack and the applied pre-compressive stress on the stack module, the glass sealing material will become viscous and intend to flow at a high temperature, and the softened glass sealing material may be squeezed out gradually. Consequently, the air-tightness between the components may be lost gradually and resulted in gas leakage, which will affect the performance and long term stability, or even catastrophic failure of the fuel cell stacks.

SUMMARY

An object of the present invention is to provide a sealing structure for assembly of fuel cell stacks or stack tower which can be called stack module either that has excellent sealing performance and durability at fuel cell operation conditions and a stack tower including the sealing structure.

To attain the object described above, in a first aspect, the present invention provides a sealing structure for stack tower, which comprises a first component, a second component and a mica spacer, wherein the first component and the second component are opposite each other, the mica spacer is disposed between the first component and the second component, sealing part is arranged between the mica spacer and at least one of the first component and the second component, and the sealing part comprises a glass, or glass ceramic layer and an outer circumferential ceramic cement ring surrounding the glass ceramic layer to form a sealing structure. The first component, the second component, the mica spacer, and the sealing structure form one repeat unit. Multiple such repeat units form a stack tower, or stack module.

Preferably, the outer circumferential ceramic cement ring is arranged along the outer circumference of the mica spacer.

Preferably, openings are formed correspondingly on the first component, the second component and the mica spacer, and the glass ceramic layer surrounds the openings.

Preferably, the glass ceramic layer extends to the edges of the openings; or the sealing part further comprises an inner circumferential ceramic cement ring surrounding the edges of the openings, and the glass ceramic layer is positioned between the outer circumferential ceramic cement ring and the inner circumferential ceramic cement ring.

Preferably, the first component comprises a first surface, the sealing part is disposed between the first surface and the mica spacer, and the outer circumferential ceramic cement ring is close to the edges of the first surface.

Preferably, at least part of the edges of the glass ceramic layer are spaced apart from the outer circumferential ceramic cement ring.

Preferably, the sealing part is provided between the mica spacer and the first component and between the mica spacer and the second component.

Preferably, the first component is a stack, and the second component is one of stack, a gas distribution plate and an interconnect plate.

In a second aspect, the present invention provides a stack tower including the sealing structure for stack tower according to the present invention.

Preferably, the stack tower is made from by connecting multiple stacks in series electrically. Each stack consists of many individual solid oxide fuel cell also connected in series electrically, for example, one stack may have 10-100 cells, or 30-60 cells.

In the sealing structure for stack tower according to the present invention, mica spacer, glass ceramic layer, and outer circumferential ceramic cement ring are used in combination; wherein, the mica spacer serves as the main sealing material as well as insulating material between the first component and the second component, which has good sealing performance and high electrical resistance at fuel cell operation conditions; the glass ceramic layer is used to further seal the possible gap between the mica spacer and the corresponding mating surface; especially, the viscosity of the glass ceramic layer is decreased with increasing temperatures, and the glass ceramic layer can fill up the gap and thereby avoid leakage from the gap; in addition, an outer circumferential ceramic cement ring is provided on the circumference of the glass ceramic layer. The outer circumferential ceramic cement ring still has high mechanical strength without deformation or fluidity at high temperatures, thus holds the glass ceramic layer in place to prevent the glass ceramic layer from being squeezed out of interface when the glass ceramic layer becomes viscous at high temperatures and/or is subjected to high stress. Thus, by utilizing the sealing structure disclosed in this invention, excellent sealing performance can be maintained between the first component and the second component at both low and high temperatures during fuel cell stack operation, or heating-up, or cooling down process, and under high stress. Moreover, the sealing structure has good thermal shock and stress resistance since the most stress from the upper component and pre-compressive stress to the stack will be applied to ceramic cement or absorbed by flexible mica layer to prevent glass ceramic forming cracks during cooling after stack tower operation when temperature is below the softening point of glass ceramic. Thus, the sealing structure disclosed in this invention can improve the gas-tightness during fuel cell operation at high temperatures to ensure long service life of the fuel cell system.

REFERENCE NUMBERS

Figure 1:
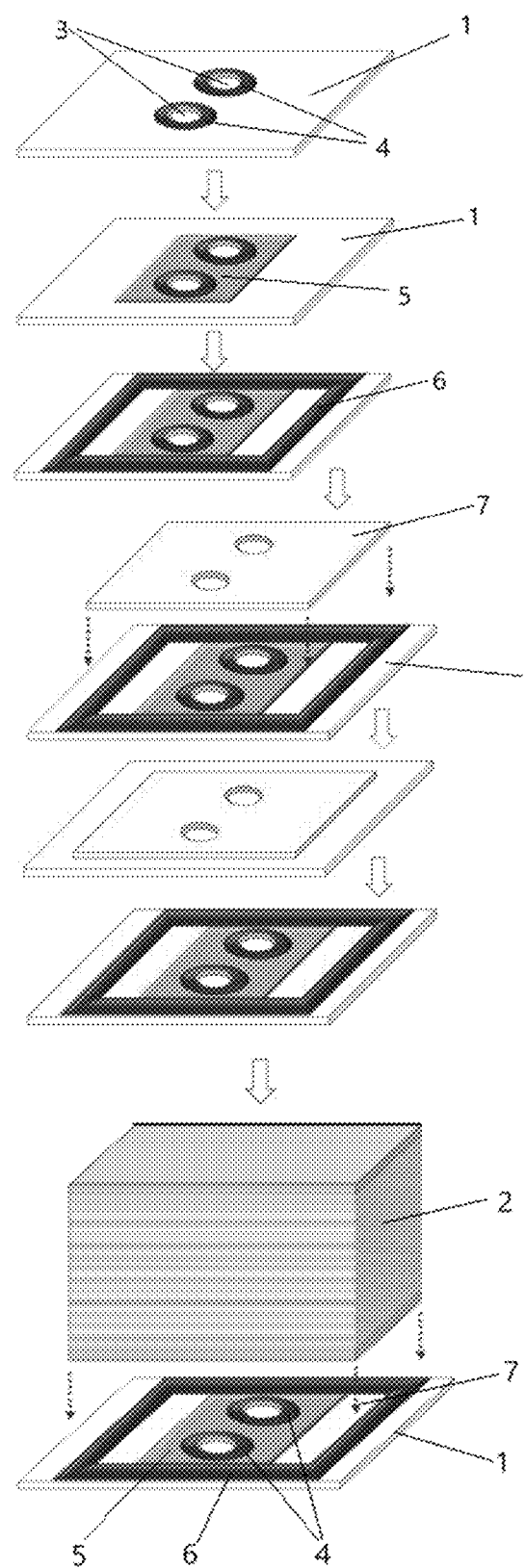
FIG. 1 is a flow chart of manufacturing of the sealing structure for assembling fuel cell stack and gas distribution plate, which is one repeat unit to form a stack tower, according to an embodiment of the present invention when the sealing structure is applied to a stack tower.

1—gas distribution plate; 2—stack; 3—opening; 4—inner circumferential ceramic cement ring; 5—glass ceramic layer; 6—outer circumferential ceramic cement ring; 7—mica spacer;

DETAILED DESCRIPTION

It should be noted that the embodiments and the features in the embodiments can be combined freely, provided that there is no confliction among them.

In the present invention, it should be understood that the orientation or positional relationships indicated by the terms "away from" and "toward", etc. correspond to the orientation or positional relationships actually used herein; and "inside" and "outside" refer to the inside and outside with respect to the outline of each component. All those terms are used for the convenience of describing the present invention rather than specifying that the referred device or component must has a specific orientation or must be constructed or operated in a specific orientation. Therefore, those terms shall not be understood as constituting any limitation to the present invention.

In the present invention, unless otherwise specified and defined explicitly, the terms "install", "connect", "fix", etc. shall be interpreted in their general meaning. For example, the connection may be fixed connection, detachable connection, or integral connection; may be mechanical connection or electrical connection or in communication with each other; may be direct connection or indirect connection via an intermediate medium, or internal communication or interactive relation between two elements. Those having ordinary skills in the art may interpret the specific meanings of the terms in the present invention in their context. Hereunder the present invention will be detailed in embodiments with reference to the accompanying drawings.

In a first aspect, the present invention relates a sealing structure for stack tower, which comprises a first component, a second component and a mica spacer, wherein the first component and the second component are opposite each other, the mica spacer is disposed between the first component and the second component, sealing part is arranged between the mica spacer and at least one of the first component and the second component, and the sealing part comprise a glass ceramic layer and an outer circumferential ceramic cement ring surrounding the glass ceramic layer.

In the sealing structure for stack tower according to the present invention, mica spacer, glass ceramic layer, and outer circumferential ceramic cement ring are used in combination; wherein, the mica spacer serves as the main sealing material between the first component and the second component, which can fill the gap of uneven surface to provide good sealing performance, and reduce the thermal and mechanical stress as well to protect glass ceramic layer; the glass ceramic layer is used to further seal the possible gap between the mica spacer and the corresponding mating surface; especially, the viscosity of the glass ceramic layer is decreased with increasing temperatures, and the viscous glass ceramic layer can fill up the open channels to prevent gas leakage; the glass ceramic layer may be formed by coating glass ceramic paste on the mica spacer or putting tape-casted glass tape on top of gas distribution plate or the mica spacer; as a sealing material, glass ceramic has the advantages of excellent sealing performance by filling the gap or any other leakage channel due to the lower viscosity at high temperatures; in addition, an outer circumferential ceramic cement ring is provided on the circumference of the glass ceramic layer. The outer circumferential ceramic cement ring still has high mechanical strength without deformation or fluidity at high temperatures, which can reduce the stress on the glass ceramic layer and thereby prevents the glass ceramic layer from being squeezed out when the glass ceramic layer is softened and flowable at high temperatures and under high stress, thus prevents sealing failure to lose gas-tightness and affect fuel cell stack performance and long term stability. Thus, by utilizing the mica spacer, the glass ceramic layer and the outer circumferential ceramic cement ring in combination, excellent sealing performance can be maintained between the first component and the second component at low temperatures, at high temperatures, and under high stress. Moreover, the sealing structure may reduce thermal and mechanical stress to protect glass ceramic layer from being damaged, especially at lower temperature. Thus, the performance and service life of the stack tower are ensured effectively, and the risk of system failure during long term operation is reduced.

The high temperature mentioned herein usually refers to 500° C. or above; for example, the internal temperature in some solid oxide fuel cells in operation state may be between 700 and 800° C. or above. In another example, the temperature of the stack tower may be from 600° C.-700° C., or 800-900 C during normal operation. The low temperature mentioned herein usually refers to 500° C. or lower, such as room temperature or the temperatures between room temperature and 500° C. which is usually lower than the glass transition temperature (Tg) of glass, and the glass ceramic becomes brittle, which can be damaged under high stress.

Specifically, the sealing structure for stack tower in the present invention has excellent sealing performance within the entire operating temperature of the stack tower or module ranging from low temperature to high temperature; at low temperature, the mica spacer, the glass ceramic layer made by mixing with binder and solvent, and the outer circumferential ceramic cement ring that mainly consists of inert ceramic phase and a high bonding material are used in combination for the sealing between the first component and the second component to ensure air-tightness at the low temperature; at high temperatures, organic phase is removed and the glass ceramic layer is partially softened to be flowable and becomes a dense layer. The softened glass can fill up the gap between the component and the mica spacer uniformly due to lower viscosity and surface tension, thereby provides excellent sealing performance; in addition, the outer circumferential ceramic cement ring has certain mechanical strength without fluidity after being cured and solidified during stack assembly process and then fired at high temperatures at fuel cell operation conditions, which can bear most of the stress during the operation or thermal cycle of the stack tower or module, thereby can effectively prevent the glass ceramic layer from being squeezed out at high temperature and under high stress, or being damaged due to its brittleness at low temperatures and under high stress to lose air-tightness during thermal cycles of the fuel cell stack modules; in summary, the sealing structure for stack tower in the present invention may still maintain excellent air-tightness for fuel cell stack tower or module after long-term operation or multiple cycles of the module, which is feasible to be implemented to stack assembly, can be shaped and positioned according to the specific structure of the components in the fuel cell stack tower, can be widely applied and ensure good air-tightness and service life of the stack tower when it is used for sealing between the components of the stack tower.

In some embodiments, the outer circumferential ceramic cement ring is arranged along the outer circumference of the mica spacer, so as to utilize the bearing ability of the outer circumferential ceramic cement ring to better balance the stack tower and distribute the stress uniformly to protect the glass ceramic layer in a better way; in addition, the glass ceramic layer can be deposited to the edges of the mica spacer to provide a better sealing effect when it is softened at high temperature or flows under stress.

In one embodiment, first component comprises a first surface and the glass ceramic seal is deposited between the first surface and the mica spacer, preferably the outer circumferential ceramic cement ring is close to the edges of the first surface, which means the outer circumferential ceramic cement ring is preferably close to the edges of the component surface to be sealed, thereby the stress can be applied to the ceramic cement uniformly and furthermore, the stress on ceramic cement can be reduced due to larger area; wherein, the expression "the outer circumferential ceramic cement ring is 'close to' the edges of the first surface" may be understood as that the outer circumferential ceramic cement ring is at a small distance from the edges of the first surface, such as about 0.1 cm-1.5 cm distance.

In some embodiments, at least part of the edges of the glass ceramic layer are spaced apart from the outer circumferential ceramic cement ring. In other words, the glass ceramic layer is not coated on the entire area enclosed by the outer circumferential ceramic cement ring; instead, the glass ceramic layer is coated only on a part of the area enclosed by the outer circumferential ceramic cement ring; in that way, the extra glass ceramic applied to the surface may fill up the empty space between the glass ceramic and ceramic cement during assembly, or heating up, or at fuel cell operation conditions under high stress to prevent glass ceramic layer being squeezed into the gas flow holes or on top of the ceramic cement layer to result in an uneven surface or cause any adverse effect. Furthermore, it can be understood that the glass ceramic layer is preferably coated on the central part of the area, or close to the gas inlet and outlet holes, enclosed by the outer circumferential ceramic cement ring.

In addition, preferably the sealing part is deposited between the mica spacer and the first component and between the mica spacer and the second component, which means the sealing part is deposited on both surfaces fitted with the mica spacer, so as to provide a better sealing effect.

In any embodiment, openings are formed correspondingly on the first component, the second component, and the mica spacer, and the glass ceramic layer is deposited surrounding the openings, which means usually the openings are formed first, then the glass ceramic layer is applied around the openings when it is coated on the surface of the first component, the second component or the mica spacer, thereby finally the glass ceramic layer surrounds the openings, i.e., the openings are located within the area enclosed by the outer edges of the glass ceramic layer.

Optionally, the glass ceramic layer extends to the edges of the openings; or, preferably the sealing part further comprises an inner circumferential ceramic cement ring surrounding the edges of the openings, and the glass ceramic layer is located between the outer circumferential ceramic cement ring and the inner circumferential ceramic cement ring, thereby the inner circumferential ceramic cement ring can effectively prevent the glass ceramic layer from being squeezed or flowing into the openings, or further improve compressive stress distribution, or reduce the compressive stress on both glass ceramic layer and the outer circumferential ceramic cement ring.

Both the first component and the second component may be plate or block parts with flat surface or in other shapes. For example, the first component may be gas distribution plate with internal piping connected to the openings and the second component may be stack formed by electrically connecting many individual cells together in series, and the surfaces of the two components are opposite each other, and the mica spacer is sandwiched between the two components.

In another embodiment, the mica spacer may not be needed if the electrical insulation is not required or not critical between the first and second components. In that case, the sealing part is the combination of the glass ceramic layer and the ceramic cement layer only.

In another embodiment, this sealing structure, without using mica spacer, can be used for cells assembly to form a SOFC stack. In that case, the first component is an interconnect plate with gas flow channels or a planar single cell, and the second component is a planar single cell, or an interconnect plate with gas flow channel. Wherein the single cell can be electrolyte-supported or anode-supported planar cell and the interconnect can be high-temperature alloy or conductive ceramic plate.

In some embodiments, the glass ceramic layer may be formed by depositing glass ceramic paste on the surface of the first component, or second component, or mica layer. The glass-ceramic paste can be made by mixing glass-ceramic powder, polymer bonding agent, plasticizer, dispersant, and organic solvent, wherein the weight percentage of the glass phase may be 60-75%, the weight percentage of the polymer bonding agent may be 3-15%, the weight percentage of the plasticizer may be 2-7%, the weight percentage of the dispersant may be 0.5-2%, and the weight percentage of the organic solvent may be 5-30%. Wherein the glass ceramic may be formed from a composition of $SiO_2$—$Al_2O_3$—$CaO$—$BaO$—$B_2O_3$ system, for example, 20-45 wt % $SiO_2$, 3-8 wt % $Al_2O_3$, 6-10 wt % $CaO$, 40-57 wt % $BaO$, and 5-8 wt % $B_2O_3$; alternatively, the glass ceramic may be formed from a composition of $SiO_2$—$Al_2O_3$—$CaO$—$MgO$—$Na_2O$ system, for example, 40-55 wt % $SiO_2$, 6-14 wt % $Al_2O_3$, 7-12 wt % $CaO$, 10-15 wt % $MgO$, 8-15 wt % $Na_2O$, 2-5 wt % $ZrO2$, and 4-9 wt % $B_2O_3$. The thickness of the glass ceramic layer may be set to 0.005-1 mm, such as 0.01-0.4 mm or 0.02-0.15 mm.

In another embodiment, the glass ceramic layer may be formed by positioning a tape-cast glass ceramic tape on the surface of the first component, or second component, or mica layer. Wherein the glass ceramic tape may be fabricated from, but not limited to, tape-casting of glass ceramic slurry being mixed by glass-ceramic powder, polymer bonding agent, plasticizer, dispersant, and solvent.

In some embodiments, the outer circumferential ceramic cement ring and the inner circumferential ceramic cement ring may be formed by high temperature ceramic cement, which may be a paste material containing ceramic powder, and the paste material of ceramic powder may comprise ceramic phase, polymer bonding agent, plasticizer, dispersant, and organic solvent, wherein the weight percentage of the ceramic phase may be 60-85%, the weight percentage of the polymer bonding agent may be 1-10%, the weight percentage of the plasticizer may be 1-5%, the weight percentage of the dispersant may be 1-3%, and the weight percentage of the organic solvent may be 5-20%, and the ceramic phase may be, but not limited to, partially or fully stabilized $ZrO_2$, such as YSZ, ScSZ, or CaSZ, $Al_2O_3$ powder, SrZrO powder, or $La_2Zr_2O_7$ powder; alternatively, the paste material of ceramic powder may comprise ceramics, high temperature bonding agent, and water, wherein the weight percentage of the ceramic phase may be 65-85%, the weight percentage of the high temperature bonding agent (such as, but not limited to, sodium silicate, phosphate etc.) may be 1-20%, and the weight percentage of water may be 5-25%.

FIG. 1 shows a flow chart of manufacturing of the sealing structure for a stack tower according to an embodiment of the present invention when the sealing structure is applied to the stack tower. Specifically, the sealing structure is used for sealing between a gas distribution plate 1 and a stack 2. In the manufacturing process, two openings 3 are formed on the gas distribution plate 1 and stack 2, respectively, wherein one opening is a fuel gas inlet, and the other opening is a fuel gas outlet; first, a high temperature ceramic cement is coated on the edges of the two openings 3 on one surface of the gas distribution plate 1, so that an inner circumferential ceramic cement ring 4 can be formed there subsequently; then a glass ceramic layer is coated on the outer circumstance of the inner circumferential ceramic cement ring 4 on said surface of the gas distribution plate 1 so as to form a glass ceramic layer 5; next, the high temperature ceramic cement is coated on the outer circumstance of the glass ceramic layer 5 on said surface of the gas distribution plate 1, so that an outer circumferential ceramic cement ring 6 can be formed there subsequently; then a mica spacer 7 is placed on said surface of the gas distribution plate 1; thus, the sealing part is formed between the gas distribution plate 1 and one surface of the mica spacer 7; next, the high temperature ceramic cement is firstly coated on the edges of two openings on the other surface of the mica spacer 7, so that an inner circumferential ceramic cement ring 4 can be formed there subsequently; then the glass ceramic is coated on the outer circumstance of the inner circumferential ceramic cement ring 4 on the other surface of the mica spacer 7 to form a glass ceramic layer 5; then high temperature ceramic cement is coated on the outer circumstance of the glass ceramic layer 5 on the other surface of the mica spacer 7, so that an outer circumferential ceramic cement ring 6 can be formed there subsequently; thus, another sealing part is formed on the other surface of the mica spacer 7; finally, a stack 2 is placed on the other surface of the mica spacer 7, thereby a sealing structure is formed between the gas distribution plate 1 and the stack 2, including the mica spacer, the sealing part between one surface of the mica spacer and the gas distribution plate, and another sealing part between the other surface of the mica spacer and the stack.

Figure 2:
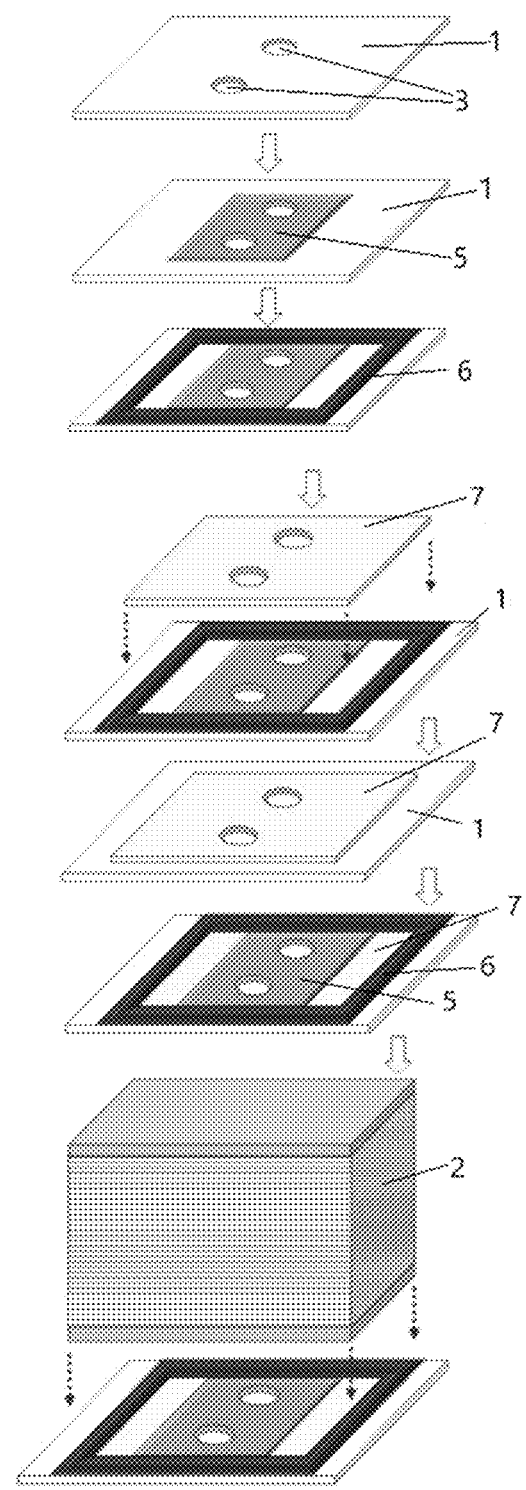
FIG. 2 is a flow chart of manufacturing of the sealing structure for assembling fuel cell stack and gas distribution plate, which is one repeat unit to form a stack tower, according to another embodiment of the present invention when the sealing structure is applied to a stack tower.

FIG. 2 shows a flow chart of manufacturing of the sealing structure for a stack tower according to another embodiment of the present invention when the sealing structure is applied to a stack tower. The difference between the embodiment shown in FIG. 2 and the embodiment shown in FIG. 1 is that no inner circumferential ceramic cement ring 4 is provided around the edges of the openings of the gas distribution plate 1 and the mica spacer 7, but the glass ceramic layer 5 directly extends to near the edges of the openings of the gas distribution plate 1 and the edges of the openings of the mica spacer 7.

In a second aspect, the present invention relates to a stack tower including the sealing structure for stack tower according to the present invention.

Specifically, the stack tower may be made from solid oxide fuel cells.

In the description of the present invention, the expressions of reference terms "an embodiment", "some embodiments", "an example", "specific example", or "some examples" mean that the specific features, structures, materials or characteristics described in those embodiments or examples are included in at least one embodiment or example of the present invention. In this document, the exemplary expression of the above terms may not necessarily refer to the same embodiment or example. Moreover, the specific features, structures, materials, or characteristics described can be combined appropriately in any one or more embodiments or example. Furthermore, those skilled in the art may combine or assemble different embodiments or examples and features in different embodiments or examples described herein, provided that there is no conflict among them.

While the present invention is described above in detail in some preferred embodiments with reference to the accompanying drawings, the present invention is not limited to those embodiments. Various simple variations may be made to the technical scheme of the present invention within the technical concept of the present invention. The specific technical features included in the present invention may be combined in any appropriate way. To avoid unnecessary repetition, the possible combinations are not described specifically in the present invention. However, such simple variations and combinations shall also be deemed as having been disclosed and falling in the scope of protection of the present invention.

The invention claimed is:

1. A sealing structure for stack tower, comprising a first component, a second component and a mica spacer, the first component and the second component are opposite to each other, and the mica spacer is disposed between the first component and the second component, wherein a sealing part is arranged between the mica spacer and at least one of the first component and the second component, and the sealing part comprises a glass ceramic layer and an outer circumferential ceramic cement ring surrounding the glass ceramic layer, wherein the sealing part is in contact with a surface of the mica spacer facing the at least one of the first component and the second component, and wherein the sealing part is in contact with a surface of the at least one of the first component and the second component facing the mica spacer.

2. The sealing structure for stack tower of claim 1, wherein the outer circumferential ceramic cement ring is arranged along the outer circumference of the mica spacer.

3. The sealing structure for stack tower of claim 1, wherein openings are formed correspondingly on the first component, the second component and the mica spacer, and the glass ceramic layer surrounds the openings.

4. The sealing structure for stack tower of claim 3, wherein the glass ceramic layer extends to the edges of the openings; or the sealing part further comprises an inner circumferential ceramic cement ring surrounding the edges of the openings, and the glass ceramic layer is positioned between the outer circumferential ceramic cement ring and the inner circumferential ceramic cement ring.

5. The sealing structure for stack tower of claim 1, wherein the first component comprises a first surface, the sealing part is disposed between the first surface and the mica spacer, and the outer circumferential ceramic cement ring is close to the edges of the first surface.

6. The sealing structure for stack tower of claim 1, wherein at least part of the edges of the glass ceramic layer are spaced apart from the outer circumferential ceramic cement ring.

7. The sealing structure for stack tower of claim 1, wherein the sealing part is provided between the mica spacer and the first component and between the mica spacer and the second component.

8. The sealing structure for stack tower of claim 1, wherein the first component is a stack, and the second component is one of a stack, a gas distribution plate and an interconnect plate.

9. A stack tower comprising the sealing structure for stack tower of claim 1.

10. The stack tower of claim 9, wherein the stack tower is made from connecting solid oxide fuel cells in series electrically.

11. A sealing structure for stack tower, comprising a first component and a second component, the first component is underneath the second component, wherein a sealing part is arranged between the first component and the second component, and the sealing part comprises a glass ceramic layer and an outer circumferential ceramic cement ring surrounding the glass ceramic layer, wherein the sealing part is in contact with a surface of a mica spacer facing the at least one of the first component and the second component, and wherein the sealing part is in contact with a surface of the at least one of the first component and the second component facing the mica spacer.

12. The sealing structure for stack tower of claim 11, wherein the first component is a gas distribution plate with internal gas piping, and the second component is a fuel cell stack.

13. The sealing structure for stack tower of claim 11, wherein the first component is a fuel cell stack with a gas flow channel on the top surface, and the second component is another fuel cell stack with a gas flow channel on the bottom surface.

14. The sealing structure for stack tower of claim 11, wherein the outer circumferential ceramic cement ring is arranged along the outer circumference of the mica space.

15. The sealing structure for stack tower of claim 11, wherein the first component is an interconnect plate with gas flow channels, and the second component is a planar fuel cell.

16. The sealing structure for stack tower of claim 11, wherein the first component is a planar fuel cell, and the second component is an interconnect plate with gas flow channels.

17. The sealing structure for stack tower of claim 11, wherein openings are formed correspondingly on the first component, the second component, and the glass ceramic layer surrounds the openings.

18. The sealing structure for stack tower of claim 11, wherein the glass ceramic layer extends to the edges of the openings; or the sealing part further comprises an inner circumferential ceramic cement ring surrounding the edges of the openings, and the glass ceramic layer is positioned between the outer circumferential ceramic cement ring and the inner circumferential ceramic cement ring.

19. The sealing structure for stack tower of claim 11, wherein the first component comprises a first surface, the sealing part is disposed between the first surface and the second component, and the outer circumferential ceramic cement ring is close to the edges of the first surface.

20. The sealing structure for stack tower of claim 11, wherein at least part of the edges of the glass ceramic layer are spaced apart from the outer circumferential ceramic cement ring.

* * * * *